United States Patent [19]
Szymusiak et al.

[11] Patent Number: 5,923,014
[45] Date of Patent: Jul. 13, 1999

[54] COMPUTERIZED SHIPMENT ERROR PROOFING SYSTEM AND METHOD

[75] Inventors: Paul A. Szymusiak, Farmington Hills; Anil J. Patel, Rochester Hills; Robert T. McMath, Shelby Township, Macomb County, all of Mich.

[73] Assignee: Electronic Data Systems Corporation, Plano, Tex.

[21] Appl. No.: 08/920,360

[22] Filed: Aug. 29, 1997

[51] Int. Cl.$^6$ .................................................. G06F 17/00
[52] U.S. Cl. ...................... 235/375; 235/376; 235/385; 705/28
[58] Field of Search ................................ 235/375, 376, 235/383, 385, 454, 470, 472.01; 902/4; 705/28; 364/478.03, 478.13, 468.22, 478.12, 478.09

[56] References Cited

U.S. PATENT DOCUMENTS

| | | | |
|---|---|---|---|
| 4,656,591 | 4/1987 | Goldberg | 235/385 |
| 4,839,813 | 6/1989 | Hills et al. | 364/464.03 |
| 5,038,283 | 8/1991 | Caveney | 235/385 |
| 5,315,508 | 5/1994 | Bain et al. | 364/401 |

FOREIGN PATENT DOCUMENTS

| | | | |
|---|---|---|---|
| 0 585 932 A2 | 3/1994 | European Pat. Off. | G06F 15/21 |

OTHER PUBLICATIONS

"On the Fast Track with TotalTrack: UPS Deploys Mobile Data Service" by Towle dated Apr./May 1993, *Document Delivery World*, vol. 9, No. 3, p. 30/31.

*Primary Examiner*—Thien Minh Le
*Assistant Examiner*—Diane I. Lee
*Attorney, Agent, or Firm*—L. Joy Griebenow; Baker & Botts L.L.P.

[57] ABSTRACT

The invention includes a method for error proofing shipments where users are presented with the options of parts marking, parts verification or pack verification using an output device. A user option choice is received using an input device. If the user chooses the parts making option, then a first part number is received from the user and causes the printing of a first quantity of labels in response to the first part number. If the user chooses the parts verification option, then a second part number is received from the user, an identification symbol is scanned using a scanner to identify an identification number associated with the identification symbol, and the identification number is then compared to the second part number. An indication is provided to the user if the identification number and second part number do not match. If the user chooses the pack verification option, then a third part number and quantity is received from the user. Each of a plurality of identification symbols are scanned using the scanner to identify an identification number associated with each identification symbol. Each identification number is compared to the third part number and an indication is provided to the user if the identification number and third part number do not match. A running total of the number of identification symbols having identification numbers matching the third part number is maintained.

20 Claims, 3 Drawing Sheets

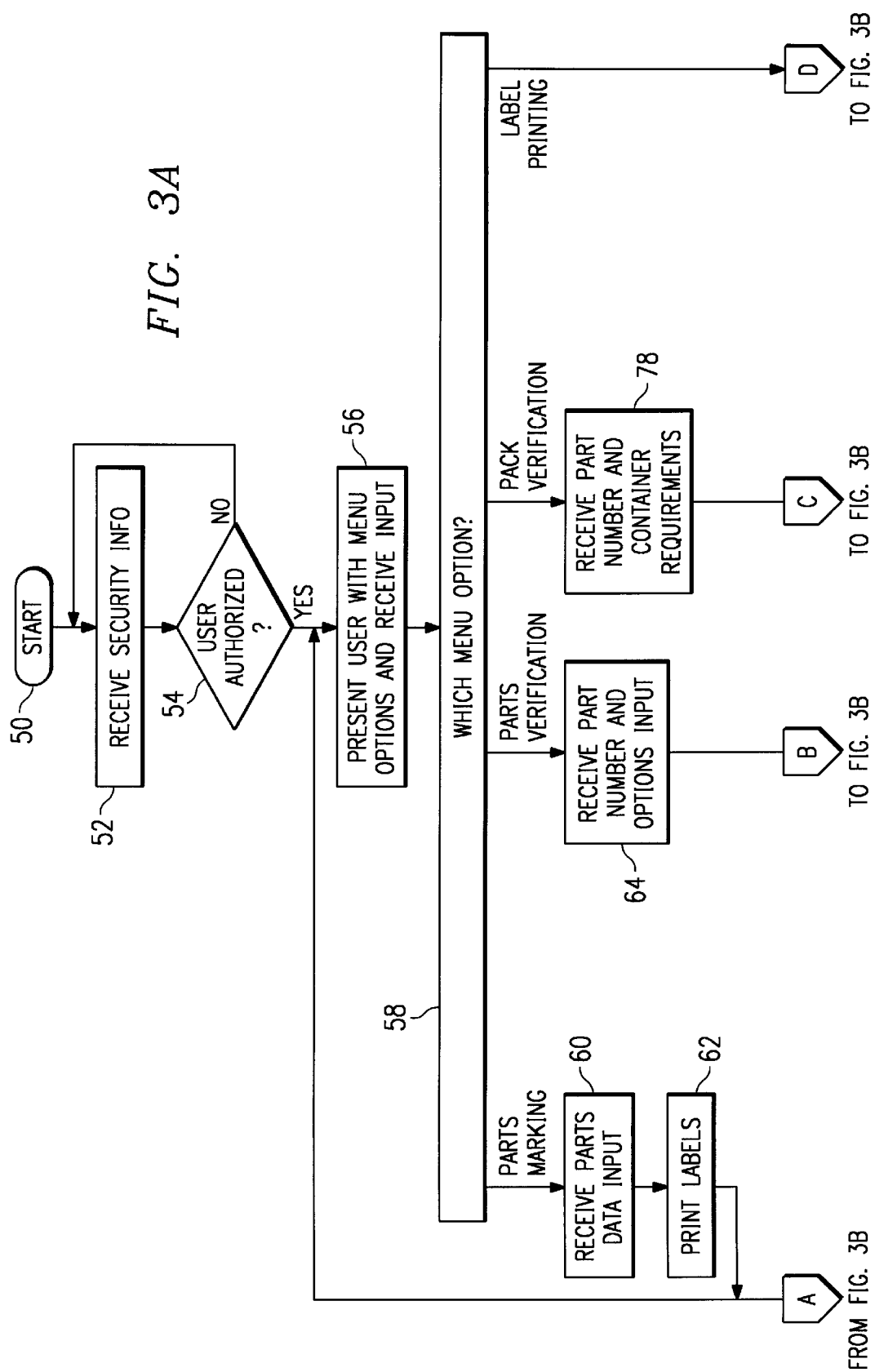

1

COMPUTERIZED SHIPMENT ERROR PROOFING SYSTEM AND METHOD

TECHNICAL FIELD OF THE INVENTION

This invention relates generally to control of product shipments and more particularly to a computerized system and method for shipment error proofing.

BACKGROUND OF THE INVENTION

Industries continually strive for cost effective means to improve customer satisfaction and deliver higher levels of quality. One source of quality problems in a manufacturing facility is mislabeled parts. Where parts are mislabeled, manufacturing on an assembly line may be less efficient and can even cause shutdown of an assembly line. Another source of quality problems is an incorrect number of parts or an incorrect part in a package of parts. Placing too many of a given part in a package will often result in the extra parts being thrown away by the consumer of the parts, and the parts manufacturer losing the money that it cost to produce the discarded part. If too few parts are included in a package or if mislabeled parts are included in a package, then assembly line efficiency may be compromised and assembly line shutdown may even occur. In addition, proper container labeling is important to be sure that a container is shipped to the correct location and that its contents are properly reflected on the label.

To prevent quality problems of this type, manufacturers often employ product identification labels such as bar codes on various parts to allow easy identification of a part and to verify the quantity of a particular part in a package. Unfortunately, such systems are often custom-developed systems that perform a subset of the functions that would be desirable for a computerized shipment error proofing system. Because such systems are often custom-developed, they are often expensive to implement.

SUMMARY OF THE INVENTION

The invention allows manufacturers and parts makers to improve product quality through the use of a computerized shipment error proofing system that is capable of performing several desired functions for system error proofing. One aspect of the invention is a method for error proofing shipments. A user is presented with the options of parts marking, parts verification or pack verification using an output device. A user option choice is received from a user using an input device. If the user chooses the parts marking option, then a first part number input is received from the user causing the printing of a first quantity of labels in response to the received first part number. If the user chooses the parts verification option, then a second part number input by the user is received. An identification symbol is scanned using a scanner to identify an identification number associated with the identification symbol. The identification number is compared to the second part number and an indication is provided to the user if the identification number and second part number do not match. If the user chooses the pack verification option, then a third part number and a quantity value are received as input from the user. Each of a plurality of identification symbols are scanned using a scanner to identify an identification number associated with each identification symbol. The identification number is compared to the third part number and an indication is provided to the user if the identification number and third part number do not match. A running total is maintained of the number of identification symbols having identification numbers matching the third part number.

The invention has several important technical advantages. The invention packages a number of desirable shipment error proofing functions in a single product. The packaging of these functions in a single product allows the creation of an affordable system that can be adapted for use at various points within a manufacturing facility. Because the invention can be used at multiple points within a manufacturing facility, use of the invention avoids the need to purchase multiple custom-developed systems. By using the invention to improve product quality, customer satisfaction is improved. The cost of rework and misshipments is also reduced or substantially eliminated. Because shipment error proofing is done automatically, the cost of manual inspection is reduced or substantially eliminated.

BRIEF DESCRIPTION OF THE DRAWINGS

For a more complete understanding of the invention and its advantages reference is now made to the following descriptions, taken in conjunction with the accompanying drawings, in which:

FIGS. 3A and 3B illustrates an example flowchart of a computerized shipment error proofing system constructed in accordance with the invention.

DETAILED DESCRIPTION OF THE INVENTION

Figure 1:
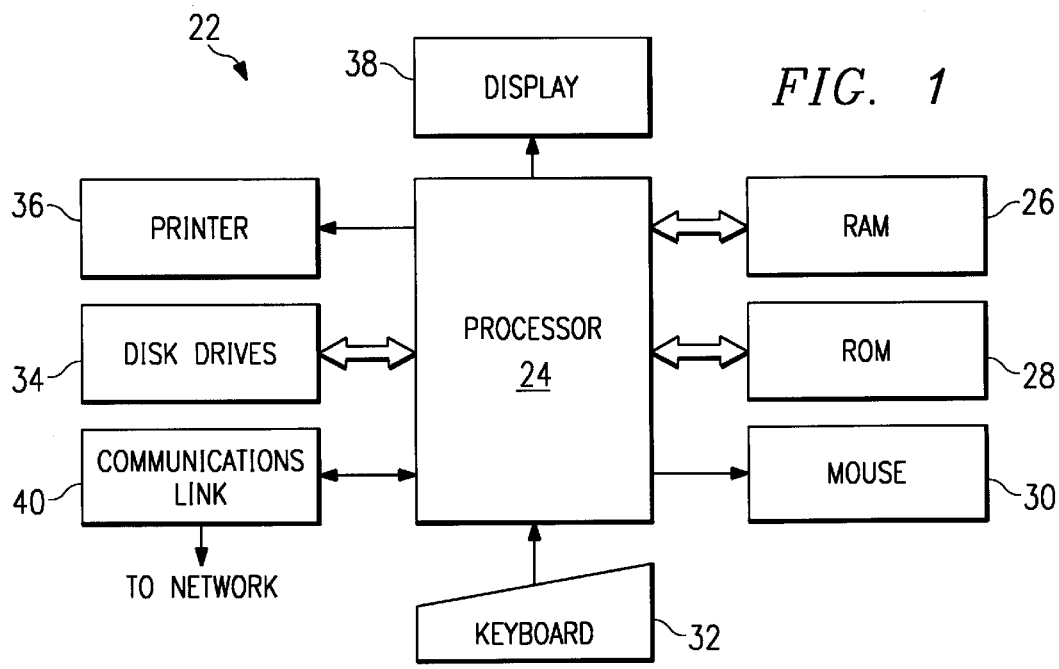
FIG. 1 illustrates a general purpose computer that may be used with the present invention.
Figure 2:
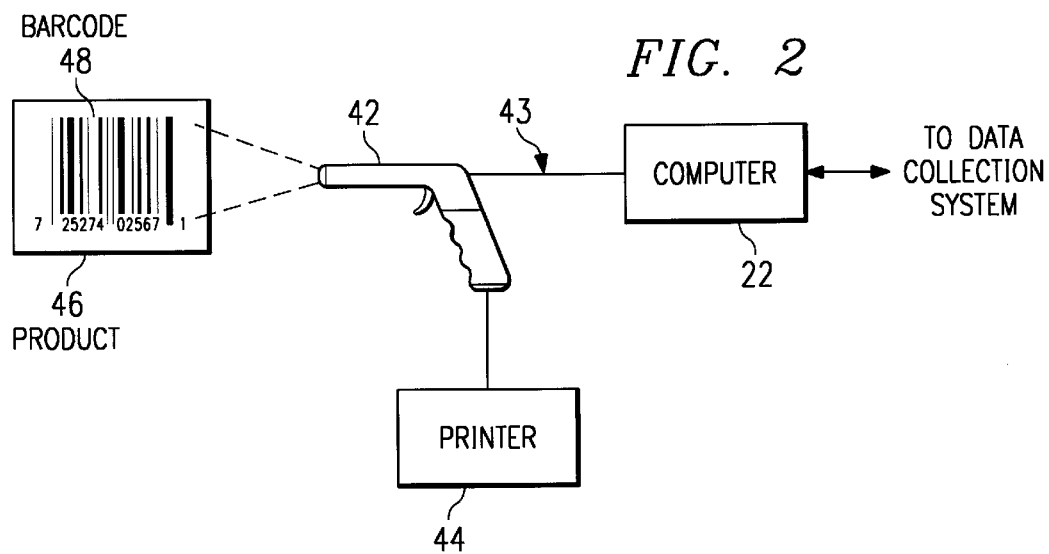
FIG. 2 illustrates a computerized shipment error proofing system constructed in accordance with the invention.
Figure 3B:
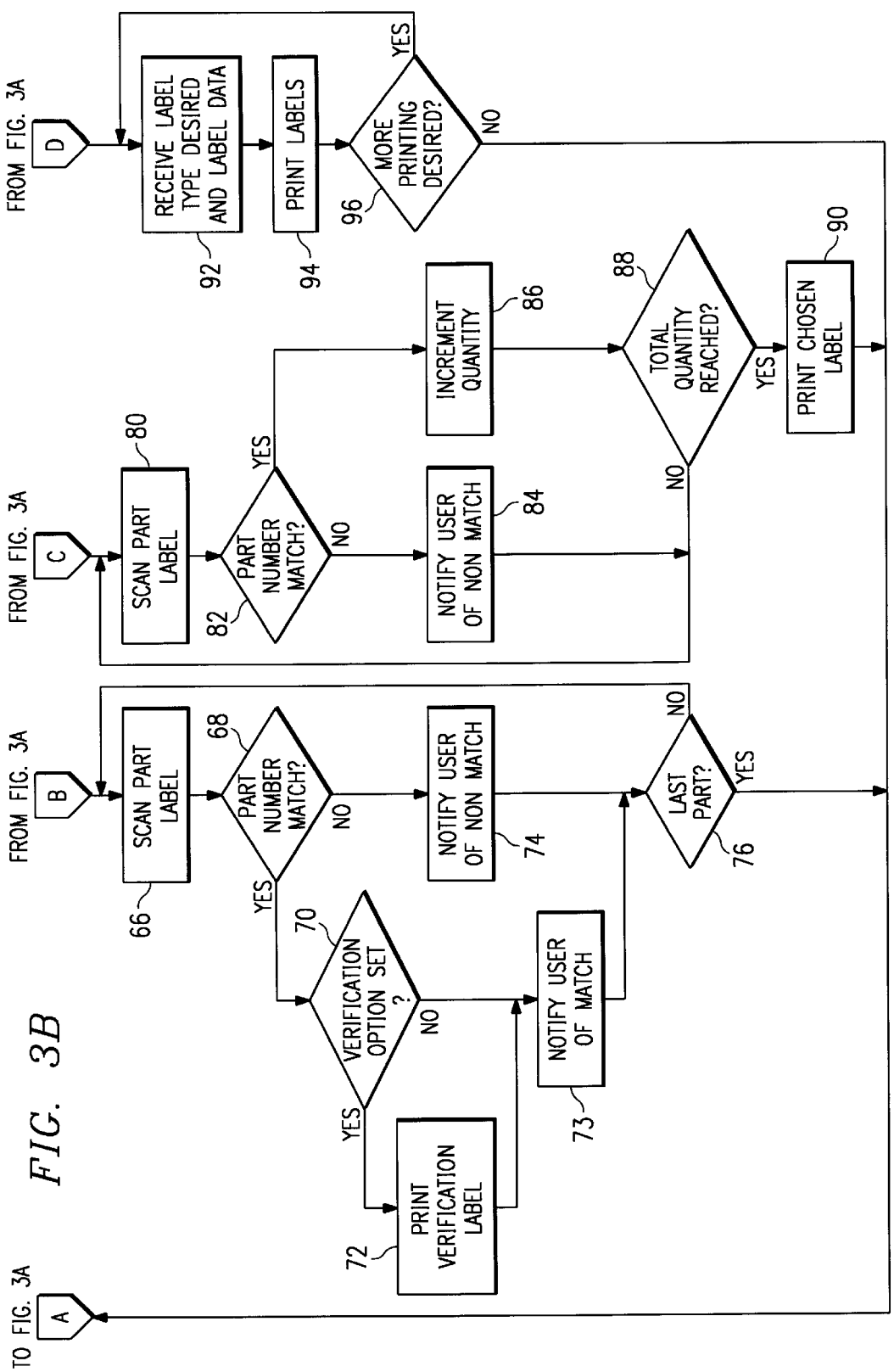

The preferred embodiment of the present invention and its advantages are best understood by referring to FIGS. 1–3 of the drawings, like numerals being used for like and corresponding parts of the various drawings.

FIG. 1 illustrates a general purpose computer 22 that may be used with the computerized shipment error proofing system of the present invention. General purpose computer 22 may be used to execute applications comprising computerized shipment error proofing systems constructed in accordance with the presence invention. General purpose computer 22 may be adapted to execute any of the well known MS-DOS, PC-DOS, OS2, UNIX, MAC-OS and WINDOWS operating systems or other operating systems. General purpose computer 22 comprises processor 24, random access memory (RAM) 26, read only memory (ROM) 28, mouse 30, keyboard 32 and input/output devices, such as disk drives 34, printer 36, display 38, and communications link 40.

The present invention includes programs that may be stored in RAM 26, ROM 28 or disk drives 34 and may be executed by processor 24. Communications link 40 is connected to a computer network but could also be connected to a telephone line, an antenna, a gateway, or any other type of communication link. Disk drives 34 may include a variety of types of storage media such as, for example, floppy disk drives, hard disk drives, CD-ROM drives, or magnetic tape drives. Although this embodiment employs a plurality of disk drives 34, a single disk drive 34 could be used without departing from the scope of the invention. FIG. 1 only provides one example of a computer that may be used with the invention. The invention could be used on computers other than general purpose computers, as well as on general purpose computers without conventional operating systems.

FIG. 2 illustrates a computerized shipment error proofing system constructed in accordance with the invention. In this embodiment, the computerized shipment error proofing system comprises software running on general purpose computer 22 and on scan gun 42. Scan gun 42 is connected to printer 44. The illustrated computerized shipment error proofing system may be used to determine the identity of a product 46 wherein product 46 has an identification symbol, such as bar code 48, readable by scan gun 42. Although scan gun 42 is operable to read a bar code 48, any type of product identification symbol could be used with an appropriate scan gun 42. In addition, any of the standard types of bar codes 48 could be used with the present invention.

In this embodiment, scan gun 42 may be a commercially available scan gun such as those available from Telxon or Symbol. Scan gun 42 may comprise a processor such as a microprocessor connected to an input device such as a keypad and an output device such as a liquid crystal display. If scan gun 42 does not provide an input device or an output device, then input devices or output devices such as are available on computer 22 may be used to take input from a user of scan gun 42 and display output from scan gun 42 to the user. In this embodiment, scan gun 42 is programmable and is capable of running computer software programs stored therein. A scanner other than a gun-type scanner could be used without departing from the scope of the invention.

Scan gun 42 is coupled to general purpose computer 22 through a communications link 43. In this embodiment, communications link 43 is a wireless radio link between scan gun 42 and general purpose computer 22. Alternatively, any other type of communications link could be used such as a serial or parallel wire link, an infrared link or a fiber optic link. Communications link 43 is used to download software to scan gun 42 as well as to receive output from scan gun 42 for data collection purposes. In this embodiment, computer 22 may either collect data output from scan gun 42 or forward data collected from scan gun 42 to a data collection system (not explicitly shown). Accordingly, general purpose computer 22 may be connected to another computer used for data collection such as, for example, through a computer network.

Scan gun 42 is also connected to printer 44. Printer 44 may be used to print labels in accordance with the invention. In this embodiment, printer 44 is connected to scan gun 42. Printer 44 may be connected to scan gun 42 through any type of communications link such as described above for communications link 43. In an alternative system, printer 44 could be connected to general purpose computer 22.

As noted, scan gun 42 is programmable and capable of executing computer software to implement the computerized shipment error proofing system of the present invention. If scan gun 42 is not capable of executing computer software that will meet a particular user's requirements, then scan gun 42 may be controlled by general purpose computer 22 and all or portions of the computerized shipment error proofing software may be stored and executed by general purpose computer 22. In such an embodiment, printer 44 may be connected to general purpose computer 22 directly rather than connected to scan gun 42. Any computer software used to implement the present invention could be stored and/or executed in scan gun 42 or general purpose computer 22 or in some other computer without departing from the scope of the invention.

The software portions of the computerized shipment error proofing system provide a number of desirable features for error proofing purposes. First, the system has a security feature to prevent unauthorized users from accessing the system. In addition, the security feature can be used for quality control purposes to verify which employee performed various quality control functions. The system thus uses a user identification number and a password protected log-in to provide secured access to the computerized shipment error proofing system. Other types of security could also be used without departing from the scope of the invention such as a retinal scan, fingerprint scan, and/or voice print recognition.

The invention provides the user with the capability to perform at least four functions relating to computerized shipment error proofing. More or less functions could be provided without departing from the scope of the invention. The functions provided are parts marking, parts verification, pack verification, and label printing. Each of these functions will be discussed below.

The parts marking function allows the user of the computerized shipment error proofing system to print a quantity of labels comprising a product identification symbol, such as bar code 48, that may be used to label a part and/or product. The user may specify the quantity of labels to be printed and may also specify whether a sequence number should be associated with each label. If a user chooses the parts marking option, then he may either scan an existing product identification symbol or may manually enter the information required to print the label containing the product identification symbols. The user may then specify whether or not sequencing of individual part numbers is desired. Sequencing allows the addition of a sequence number following a part number on the label that may allow more efficient quality control during a parts verification or a pack verification operation.

For example, an employee may mistakenly scan a particular product identification symbol multiple times during a parts verification or a pack verification operation. Scanning the same product multiple times may lead to an improper quantity verification in a pack. Alternatively, an employee might scan one part multiple times and fail to scan other parts, thus preventing that employee from truly verifying the identity of a particular part. A sequence number can be used to detect improper employee actions of this type. When a duplicate sequence number is detected, an error message as well as an audible and/or visual alert may be generated so that the employee and/or the quality control department is aware of the duplicate sequence number. In addition, duplicate sequence numbers could be recorded using a data collection function, allowing historical identification of quality problems.

The final value that the user is allowed to specify during a parts marking operation is the quantity of labels to be printed. After the user has input this information using either an input device such as a keypad on scan gun 42 or keyboard 32 of general purpose computer 22, then the labels will be printed on printer 44. The user of the computerized shipment error proofing system may specify the format of the label to be printed.

The parts verification function is used to verify that previously labeled parts have the correct part number on their identification symbol. A user desiring to use this option enters the part number and product number (if applicable) that it is to be verified against. The data may be input manually using a keyboard on scan gun 42 and/or keyboard 32 of general purpose computer 22. Alternatively, a product identification symbol that the user of the system knows is correct may be scanned by scan gun 42 to provide a part number to verify identification symbols against.

To verify that a particular part is correct, the user scans the product identification symbol and the system then compares the part number represented by the identification symbol to the part number that was input by the user. The user is then provided with a visual and audible acknowledgment that the scanned identification symbol either contains or does not contain the correct part number. Alternatively, only a visual acknowledgment or only an audible acknowledgment could be provided. In addition, an acknowledgment may be provided only when the scanned part number does not match the previously input part number. Also, an acknowledgment could be provided only when the scanned part number does match the previously entered part number.

In addition to providing visual and audible acknowledgment after each product identification symbol is scanned, a verification label may be printed after each product number is verified so that other personnel within a manufacturing facility can easily determine that the user of the computerized shipment error proofing system verified the identity of the part in question. Such a label might also be called a detection label. As the verification label is printed, data related to the verification may be sent to a data collection system.

Another function that a user of the computerized shipment error proofing system may choose is pack verification. This option might also be termed container verification. This option is used to verify that all of the parts in a particular pack or container have a given part number and, in addition, that the correct quantity of that part number is contained within the pack.

Initially, the user inputs the information used for a pack verification. Such information may include the part number and pack quantity. Such information might also include information associated with the customer for the part and the pull number for the part. This information can be entered each time a pack verification operation is performed or information about standard packs might be stored in general purpose computer 22 or scan gun 42. If a general pack description is used, then the user need only input a particular identifier associated with a standard pack to begin the pack verification operation. The information may either be input manually or scanned using scan gun 42. Accordingly scan gun 42 may act as an input device or some other input device such as a keyboard can be used.

To verify the pack, the user scans the product identification symbol such as bar code 48 attached to each product 48 in a pack. After each part is scanned, an appropriate acknowledgment may be provided to the user such as is described above in connection with the parts verification option. All of the options available for acknowledgment in the parts verification option could be used after scanning each part with scan gun 42 in the pack verification option. The computerized shipment error proofing system maintains a running total of the number of identification symbols on the products 46 that have identification symbols matching the part number being verified against. Once the running total reaches the standard pack quantity, then an acknowledgment is provided to the user. Again, this acknowledgment may be visual, audible, or both. Also, a label, such as a shipping label, might be generated automatically when the standard pack quantity has been verified. The format of this label may be specified by the user of the computerized shipment error proofing system.

Optionally, the user of the system may choose to verify a pack using sequence numbers for the parts. When this option is selected, the system will reject parts with duplicate sequence numbers as incorrectly labeled parts. In addition, these parts will not be included in the running quantity total for that pack. This feature of the invention prevents an employee from accidentally scanning the same parts twice.

Another function provided to a user is the label printing option. A user choosing the label printing option can print labels of several different preconfigured label formats. For example, the invention allows printing of a product label that serves as an identification symbol for the product or part. A verification or detection label can also be printed manually where such a label indicates that a particular part's identity has been verified. A line code label may also be printed. A line code label indicates where a single part or group of parts is to be delivered, for example, to a specific location in a customer's plant. In some industries, parts suppliers are responsible for delivering parts to a particular point on an assembly line in a manufacturing facility of the parts supplier's customer. A line code label would indicate the point in the assembly plant where the part is to be delivered. The invention may also be used to print standardized labels for a particular industry. For example, in the automotive industry the Automotive Industry Action Group (AIAG) defines a standard AIAG shipping label that automotive part suppliers place on containers of parts for delivery to auto manufacturers. The requirements for this label change from time to time. The invention allows various label formats to be designed to accommodate changing standards such as the AIAG standard.

FIG. 3 illustrates a flowchart of the operation of an exemplary embodiment of a computerized shipment error proofing system constructed in accordance with the invention. Operation begins at step 50 and security information is received from the user in step 52. In this embodiment, the security information comprises a user identification and password. In step 54 it is determined whether the user is authorized to use the system. If not, then the user is prompted for correct security information in step 52. If so, then the user is presented with a number of menu options for use of the system and input is received from the user in step 56. In step 58 it is determined which menu option the user has selected.

If the user has selected the parts marking option, then the user inputs the parts data either manually using a device such as a keypad or automatically using a device such as scan gun 42. If applicable, the user may also input a master product number and specify whether sequencing of part numbers is to be provided. Then, in step 62, labels are printed containing an identification symbol, such as a bar code 48, used to identify the particular part or product. The labels are printed in sequence if sequencing was selected. After the labels are printed, the user is again presented with a menu of options in step 56.

If the user chose the parts verification option in step 58, then in step 64 the user inputs the part number and options for parts verification. The user may input manually or scan the master product number (if applicable) and part number. The user may also specify whether a detection or verification label is to be printed after the verification of each part number.

In step 66, a part label is scanned using scan gun 42. In step 68, it is determined whether the scanned part number matches the master part number that was input by the user initially. If the numbers match, then it is determined in step 70 whether the verification option is set. If so, then a verification label is printed in step 72 and the procedure continues in step 73. If the verification option is not set, then the user is simply notified that the product matches in step 73. If the part numbers did not match in step 68, then the user is notified of the non-match condition in step 74. During either notification step, data regarding the present scan may be sent to a data collection system. The user is then asked whether the part scanned is the last part. If so, then control returns to the main menu in step 56. If not, then scan gun 42 may be used to scan the next part for verification in step 66.

Returning to step 58, if the pack verification option was chosen, then the user inputs the part number and container requirements in step 78. This information can be input manually or scanned. As discussed above, the container requirements may include a part number, pack quantity, supplier information, and/or a pull number. Next, in step 80, the first part label is scanned using scan gun 42. In step 82 it is determined whether the part number matches the part number against which verification is being performed. If not, then the user is notified of the non-match in step 84 and scan gun 42 may then be used to scan the next part label in step 80. During step 84, data could also be logged to a data collection system. If the part number does match, then a running quantity is incremented in step 86. In step 88, it is determined whether the total quantity for the pack has been reached. If not, then scan gun 42 is enabled to scan the next part label in step 80. If so, then the appropriate label is printed in step 90 based upon the choice of the user. If the user has chosen a data collection option, then data regarding a particular verification may be sent to a data collection system concurrently with the printing of the chosen label in step 90. Scan gun 42 may store all verification information associated with a particular part for data collection. Alternatively, data could be collected after each scan and sent to the data collection system in step 84 or step 86. The part number match inquiry in step 82 may also determine whether the sequence number for the particular part is a unique sequence number or not. If the part number is a match but the sequence number is not unique, then the part number match does not match and is treated as a nonmatch.

Returning to step 58, if the label printing option was selected, then in step 92 the user inputs the label type and any desired label data required to be input. In step 94 the appropriate label or labels are printed. Then, in step 96 the user is asked whether more printing is desired. If so, then additional input is requested by the user in step 92. If not, then control returns to the main menu in step 56.

Although the present invention has been described in detail, it should be understood that various changes, substitutions, and alternations can be made hereto without departing from the spirit and scope of the invention as defined by the appended claims.

What is claimed is:

1. A computerized shipment error proofing system, comprising:
    a processor;
    an input device coupled to the processor;
    an output device coupled to the processor;
    a scanner operable to read an identification symbol, the scanner coupled to the processor;
    an error proofing program running on the processor and operable to
        present a user with an options of parts marking, parts verification or pack verification using the output device,
        receive a user option choice from a user using the input device,
        receive a marking part number input by the user and cause the printing a first quantity of labels in response to a marking part number if the user chooses the parts marking option,
        receive a parts verification part number input by the user, scan an identification symbol using the scanner to identify an identification number associated with the identification symbol, compare the identification number to the parts verification part number, and provide an indication to the user if the identification number and parts verification part number do not match if the user chooses the parts verification option, and
        receive a pack verification part number and a desired quantity input by the user, scan each of a plurality of identification symbols using the scanner to identify an identification number associated with each identification symbol, compare each identification number to the pack verification part number, provide an indication to the user if the identification number and pack verification part number do not match, and maintain a running total of the number of identification symbols having identification numbers matching the pack verification part number if the user chooses the pack verification option.

2. The system of claim 1, wherein the scanner further comprises, the input device, the processor and a storage medium and wherein the error proofing program is stored in the storage medium.

3. The system of claim 1, wherein the error proofing program is further operable to cause a unique sequence number to be printed on each of the first quantity of labels if the user chooses the parts marking option.

4. The system of claim 1 wherein the first quantity is determined based upon user input.

5. The system of claim 1, wherein the error proofing program is further operable to cause the printing of a verification label if the identification number and parts verification part number match if the user chooses the parts verification option.

6. The system of claim 1, wherein the error proofing program is further operable to cause the printing of a pack label when the running total is equal to a desired quantity if the user chooses the pack verification option.

7. The system of claim 1, wherein the processor is contained in a computer coupled to the scanner.

8. The system of claim 1, wherein the input device comprises a keypad coupled to the scanner and the output device comprises a display coupled to the scanner.

9. A computerized shipment error proofing system, comprising:
    a computer-readable storage medium;
    an error proofing program stored on the computer-readable storage medium and operable to
        present a user with an options of parts marking, parts verification or pack verification using an output device,
        receive a user option choice from a user using an input device,
        receive a marking part number input by the user and cause the printing a first quantity of labels in response to the marking part number if the user chooses the parts marking option,
        receive a parts verification part number input by the user, scan an identification symbol using a scanner to identify an identification number associated with the identification symbol, compare the identification number to the parts verification part number, and provide an indication to the user if the identification number and parts verification part number do not match if the user chooses the parts verification option, and receive a pack verification part number and a quantity input by the user, scan each of a plurality of identification symbols using the scanner to identify an identification number associated with each identification symbol, compare each identification number to the pack verification part number, provide an indication to the user if the identification number and pack verification part number do not match, and maintain a running total of a number of identification symbols having identification numbers matching the pack verification part number if the user chooses the pack verification option.

10. The system of claim 9, wherein the error proofing program is further operable to cause a unique sequence number to be printed on each of the first quantity of labels if the user chooses the parts marking option.

11. The system of claim 9 wherein the first quantity is determined based upon user input.

12. The system of claim 9, wherein the error proofing program is further operable to cause the printing of a verification label if the identification number and parts verification part number match if the user chooses the parts verification option.

13. The system of claim 9, wherein the error proofing program is further operable to cause the printing of a pack label when the running total is equal to a desired quantity if the user chooses the pack verification option.

14. The system of claim 13, wherein the pack label comprises a shipping label.

15. The system of claim 13, wherein the pack label comprises a line code label.

16. A method for error proofing shipments, comprising:

presenting a user with an options of parts marking, parts verification or pack verification using an output device, receiving a user option choice from a user using an input device, receiving a marking part number input by the user and causing the printing a first quantity of labels in response to the marking part number if the user chooses the parts marking option, receiving a parts verification part number input by the user, scanning an identification symbol using a scanner to identify an identification number associated with the identification symbol, comparing the identification number to the parts verification part number, and providing an indication to the user if the identification number and parts verification part number do not match if the user chooses the parts verification option, and receiving a pack verification part number and a quantity input by the user, scanning each of a plurality of identification symbols using the scanner to identify an identification number associated with each identification symbol, comparing each identification number to the pack verification part number, providing an indication to the user if the identification number and pack verification part number do not match, and maintaining a running total of a number of identification symbols having identification numbers matching the pack verification part number if the user chooses the pack verification option.

17. The method of claim 16, further comprising:

causing a unique sequence number to be printed on each of the first quantity of labels if the user chooses the parts marking option.

18. The method of claim 16 wherein the first quantity is determined based upon user input.

19. The method of claim 16, further comprising:

causing the printing of a verification label if the identification number and parts verification part number match if the user chooses the parts verification option.

20. The method of claim 16, further comprising:

causing the printing of a pack label when the running total is equal to a desired quantity if the user chooses the pack verification option.

* * * * *